UNITED STATES PATENT OFFICE.

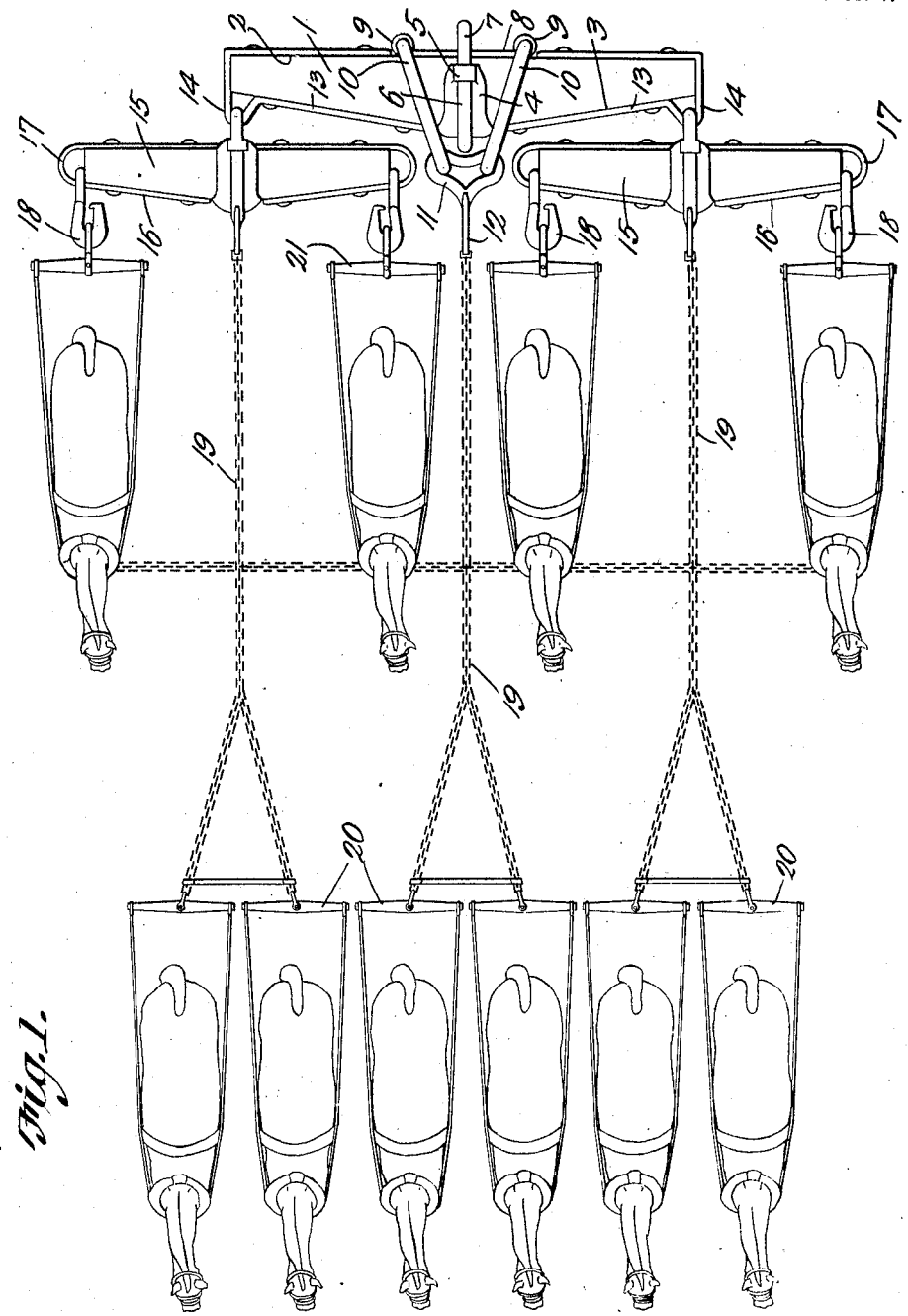

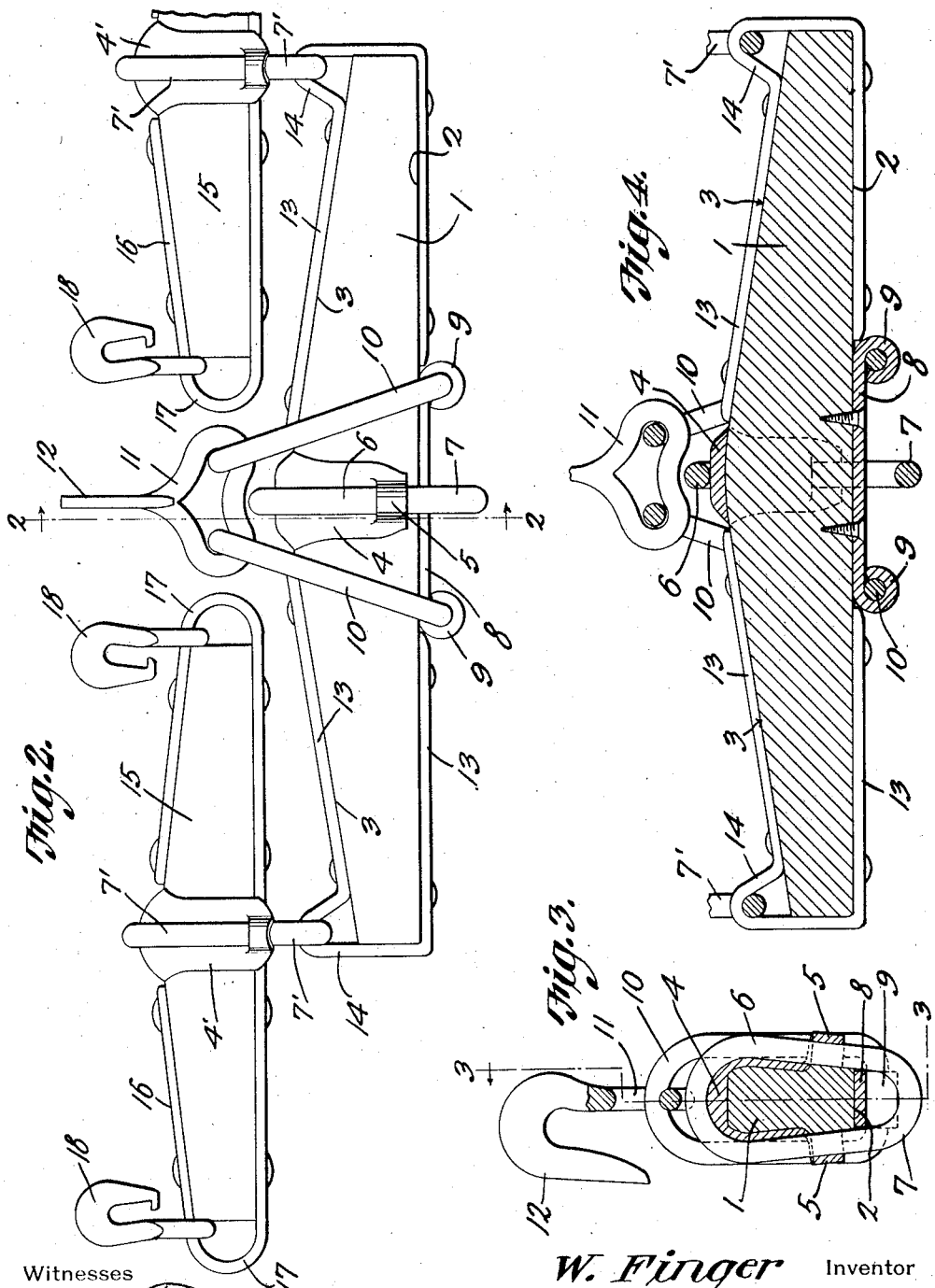

WILL FINGER, OF GASTONIA, NORTH CAROLINA.

WHIFFLETREE.

1,356,058.  Specification of Letters Patent.  Patented Oct. 19, 1920.

Application filed September 11, 1919. Serial No. 323,070.

*To all whom it may concern:*

Be it known that I, WILL FINGER, a citizen of the United States, residing at Gastonia, in the county of Gaston and State of North Carolina, have invented a new and useful Whiffletree, of which the following is a specification.

This invention relates to whiffletrees for use where a number of draft animals are to be hitched to a single structure, one of the objects of the invention being to provide a whiffletree which is reinforced so as to be capable of resisting wear and strains, novel means being employed whereby pulling strains which may be transmitted to the whiffletree through chains or other draft appliances, will be distributed to the whiffletree in such a manner as to reduce the liability of breaking the same.

A still further object is to provide simple and efficient means for engaging a clevis, hook or the like to couple the whiffletree to a load.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

In said drawings.—

Figure 1 is a plan view in diagram showing how the present improvement may be used with a number of draft animals.

Fig. 2 is a plan view of a structure embodying the present improvements.

Fig. 3 is a section on line 2—2 Fig. 1.

Fig. 4 is a section on line 3—3 Fig. 2.

Referring to the figures by characters of reference 1 designates the body of a whiffletree preferably provided with a straight rear face 2 but with front faces 3 which converge forwardly. Embracing the whiffletree at the front thereof is a yoke 4 which extends rearwardly along the upper and lower faces of the whiffletree and is provided, at its rear end, with outstruck loops 5. A link 6 is extended through these loops and along the outer faces of the yoke, this link projecting rearwardly beyond the whiffletree as indicated at 7, while the front portion of the link bears tightly against the front portion of the yoke, thereby to transmit strains through the yoke to the whiffletree when the link 7 is coupled to a hook or other device carried by the load to be drawn.

Secured to the back face of the whiffletree and extending through the rearwardly projecting portion 7 of the link, is a combined wear and attaching plate 8 having terminal eyes 9 in which are pivotally mounted forwardly converging links 10. These links extend entirely around the whiffletree and their forward ends project beyond the front face of the whiffletree and engage a loop 11 provided at one end of a hook 12. The back portion of the loop is preferably bowed as shown particularly in Fig. 1, thus to bridge around the forward end of the link 6. Attached to the front faces of the whiffletree are wear straps 13 the ends of which come up close to the sides of the yoke 4. These straps are bent forwardly at the ends of the whiffletree to provide attaching loops 14 and are then extended rearwardly along the ends of the whiffletree and thence toward each other, said straps terminating on the back face of the whiffletree close to the eyes 9 as shown.

The loops 14 are adapted to be engaged by links 7' which correspond with the links 7 but extend around yokes 4' embracing a swingletree 15. As shown, the wear straps 16 on the swingletrees can each be made continuous, each strap extending from one side of the front of the yoke 4' along the front face of the swingletree and thence along the back face of the swingletree and finally back to the other side of the front of the yoke, those portions of the straps projecting beyond the ends of the swingletree providing loops 17 for engagement by hooks 18.

It will be apparent that when a draft chain or the like is attached to the hook 12 and the rearwardly projecting portion of the link 7 is attached to the load to be drawn, the strain will be distributed through the links 10 to the back face of the whiffletree and the tendency of the whiffletree to break at the center is thus materially reduced. Furthermore it is not necessary to perforate the whiffletree as heretofore as the connection is provided through the yoke 4 which straddles the whiffletree and the link 6 which in turn extends around the whiffletree and the yoke. By eliminating all apertures in the whiffletree the same is rendered much stronger than heretofore. Likewise the swingletrees are also made stronger by eliminating perforations which have heretofore been provided for attaching bolts and the like.

As shown in Fig. 1, a whiffletree such as herein described is especially useful where a number of draft animals are to be used in pulling a single structure. Chains 19 may be attached to the front portions of the links 7' and to the hook 12 and to each of these chains may be attached a pair of swingletrees 20. Swingletrees 21 may also be attached to the hooks 18. Thus with the arrangement shown in Fig. 1, ten draft animals may be readily hitched to a structure, the improvements constituting the present invention being so constructed as to resist fully the severe strains to which they are subjected.

What is claimed is:—

1. A whiffletree including a body, a yoke embracing the front portion of the body at the center thereof and extending rearwardly along the upper and lower faces of the body, said yoke having outstruck loops, a link extending around the whiffletree and yoke and through the loops, said link having a rearwardly projecting attaching portion and a forwardly projecting wear portion, forwardly extending links attached to the back portion of the whiffletree at opposite sides of the yoke, and an attaching element connected to said links and supported in front of the yoke and the link engaging the same.

2. A whiffletree including a body, a yoke embracing the front portion thereof at the center thereof and engaging the upper and lower faces of the body, said yoke having outstruck loops, a link extending around the yoke and body and through the loops, said link projecting rearwardly to form an attaching portion, an attaching plate secured to the back of the body and extending through the link, said plate having terminal eyes, links pivotally connected to the eyes and extending around the body and beyond the front of the yoke, and an attaching element engaged by the forward ends of said last named links.

3. A whiffletree including a body, a yoke embracing the front portion of the body at the center thereof and extending rearwardly along the upper and lower faces of the body, said yoke having outstruck loops at the free ends thereof, a link extending around the whiffletree and yoke and having opposed portions extending through the loops, said link projecting rearwardly to form an attaching portion, a wear strap secured along the front and back faces of the body and forming an attaching loop at the end of the body, and a draft element attached to said loops.

In testimony that I claim the foregoing as my own, I have hereto affixed my signature in the presence of two witnesses.

WILL $\overset{\text{his}}{\times}$ FINGER.
mark

Witnesses:
J. C. COFFEY,
ERNEST COFFEY.